(No Model.)
H. C. CROWELL.
TAPER SLEEVE FASTENING FOR PULLEYS, &c.
No. 281,618. Patented July 17, 1883.
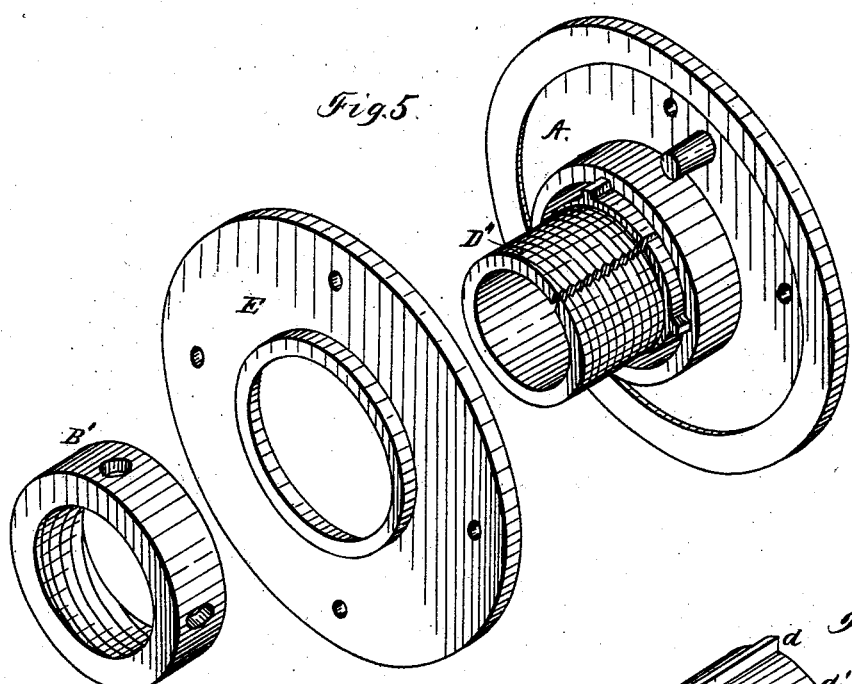
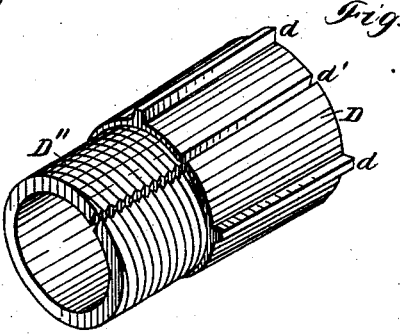
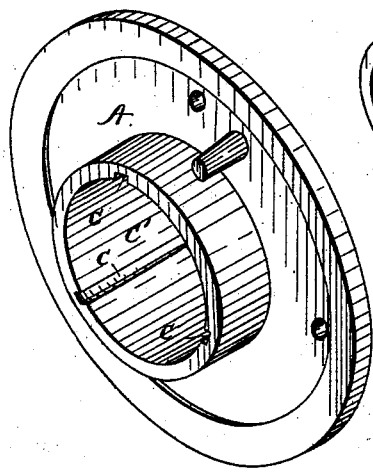
Witnesses
W. R. Edelen,
M. A. Edelen
Inventor,
H. C. Crowell,
Per Hallock & Hallock
Att's

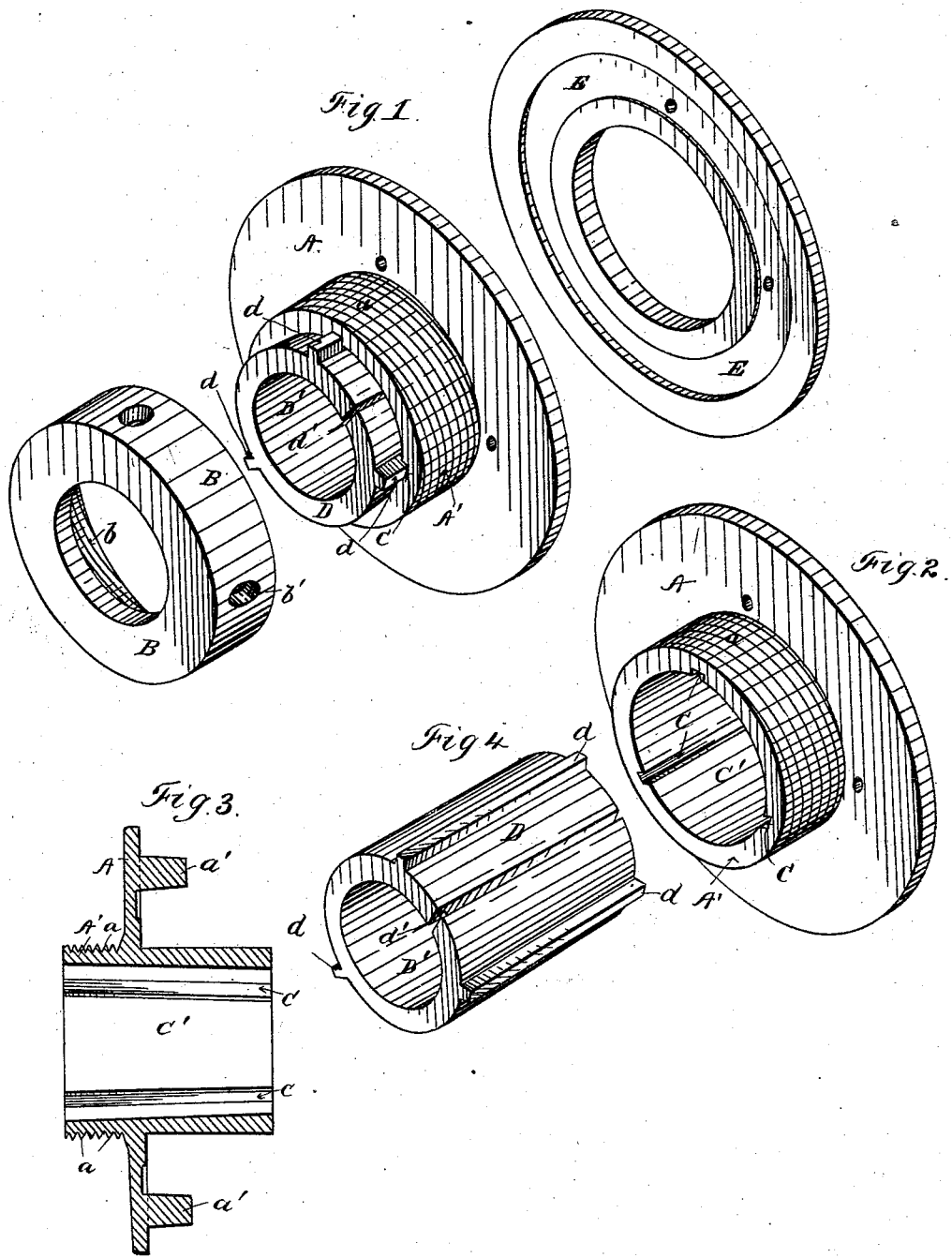

UNITED STATES PATENT OFFICE.

HILEN C. CROWELL, OF ERIE, PENNSYLVANIA.

TAPER-SLEEVE FASTENING FOR PULLEYS, &c.

SPECIFICATION forming part of Letters Patent No. 281,618, dated July 17, 1883.

Application filed November 22, 1882. Renewed June 22, 1883. (No model.)

*To all whom it may concern:*

Be it known that I, HILEN C. CROWELL, a citizen of the United States, residing at Erie, in the county of Erie and State of Pennsylvania, have invented certain new and useful Improvements in Taper-Sleeve Pulley-Fastenings; and I do hereby declare the following to be a full, clear, and exact description of the invention, such as will enable others skilled in the art to which it appertains to make and use the same.

This invention relates to what are known as "taper-sleeve" fastenings for machine-pulleys and other wheels and shaft-couplings.

The invention consists in an improved construction of the sleeve, together with the parts and combination of parts necessary for operating the fastening.

The accompanying drawings illustrate my invention as follows:

Figure 1 is a perspective view, and shows the hub-irons of a wooden pulley, which consist of the flanges A and E, of which A has a hub part, A'. The figure shows also the tapered clamping-sleeve D and the nut B, by which the sleeve is crowded into the hub. These parts are all shown in relative position, but not in actual position, except that the sleeve D is shown in place within the hub. Fig. 2 is a perspective view of the flange A with the sleeve D removed. Fig. 3 is a vertical section of the flange A, taken longitudinally with the shaft. Fig. 4 is a perspective view of the sleeve D. Figs. 5, 6, and 7 are similar views to Figs. 1, 2, and 4, but show an alternative construction and arrangement of parts.

Heretofore taper-sleeve fastenings for pulleys have been made with the sleeve turned up perfectly smooth, both inside and out, and the cavity C' of the hub bored out smooth. The objection to such a construction is that, in driving in the sleeve to secure the proper grip upon the shaft, there is too much surface in frictional contact, producing so much friction that a great deal of power is required to move the sleeve. Besides the above difficulty, the cost of finishing up so much surface is too great.

The object of this invention is to avoid and remedy the above objections. I do this by providing the sleeve with ribs *d*, and the cavity of the hub with grooves C, into which the ribs *d* seat. The only surfaces of the parts D and A which are in contact are the top surfaces of the ribs and the bottoms of the grooves, making in all a very small area and incurring only a minimum of friction, and, in fact, if it is desired, these surfaces can be lubricated, which could not be done when the sleeve was plain. The surfaces just named as being in contact can be finished very cheaply—indeed much more so than when the whole sleeve and the cavity C' are finished, for it may all be done on an emery-wheel, if desired. Of the two constructions shown, the difference lies in the manner of applying the nut which crowds the sleeve in. In the construction shown on Sheet 1 the screw-thread is cut on the hub A', and the nut B passes over the sleeve D like a cap, and screws upon the hub, and thus pushes the sleeve D into the hub, while in the construction shown in Sheet 2 the nut B' screws upon a thread, D'', on the sleeve and bears against the hub, and thus draws the sleeve into the hub. I consider the former construction preferable, inasmuch as the screw can be of much greater diameter, and the contraction of the sleeve by the action of the screw in forcing it into the hub does not also contract the male screw, and thus loosen it.

Of course it will be understood that the construction here shown can be applied to ordinary iron pulleys and to taper-sleeve-shaft couplers. I may also say that the grooves C may be omitted, if desired, and the cavity C' can be turned or finished up smooth; or the ribs may be in the cavity and the sleeve be made smooth. In either case the result would be the same as to diminishing the friction. I prefer the use of grooves, because it permits me to lubricate the surfaces in contact.

What I claim as new is—

1. In a taper-sleeve fastening for attaching pulleys, &c., upon shafting, the ribs *d*, arranged with relation to the sleeve D and the cavity C', substantially as and for the purposes mentioned.

2. In a taper-sleeve fastening for attaching pulleys, &c., upon shafting, the ribs *d* and grooves C, arranged with relation to themselves and the sleeve D and cavity C', substantially as and for the purposes mentioned.

3. In a taper-sleeve fastening for attaching pulleys, &c., upon shafting, the combination, substantially as shown, of the hub A′, with external screw-thread, $a$, and internal grooves, C, the sleeve D, with ribs $d$, and the cap-nut B, engaging with said screw-thread $a$ and inclosing the end of said sleeve.

In testimony whereof I affix my signature in presence of two witnesses.

HILEN CANFIELD CROWELL.

Witnesses:
 JNO. K. HALLOCK,
 W. S. BROWN.